(12) United States Patent
Kato

(10) Patent No.: US 6,381,331 B1
(45) Date of Patent: Apr. 30, 2002

(54) INFORMATION SENDING SYSTEM AND METHOD FOR SENDING ENCRYPTED INFORMATION

(75) Inventor: Takehisa Kato, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/166,285

(22) Filed: Oct. 5, 1998

(30) Foreign Application Priority Data

Oct. 6, 1997 (JP) .............................. 9-272793

(51) Int. Cl.[7] ................................ G06F 1/26
(52) U.S. Cl. .................... 380/37; 380/277; 713/168; 713/200
(58) Field of Search .................... 380/28, 29, 259, 380/277, 37; 713/168, 200

(56) References Cited

U.S. PATENT DOCUMENTS 5,517,614 A * 5/1996 Tajima et al. ............... 395/180
5,638,445 A * 6/1997 Spelman et al. ............. 380/21

OTHER PUBLICATIONS

Shinichi Ikeno et al., "Modern Cryptography Theory", Ed., The Institute of Electronics, Information and Communication Engineers, pp. 105–123.

Eiji Okamoto, "Introduction to Theory of Cryptography", Kyoritsu Shuppan, pp. 88–99.

* cited by examiner

Primary Examiner—Thomas R. Peeso
(74) Attorney, Agent, or Firm—Finnegan, Henderson, Farabow, Garrett & Dunner, L.L.P.

(57) ABSTRACT

This invention discloses an information sending system for sending encrypted information which can be decrypted in units of parts of information. This information sending system includes information segmentation means for segmenting information into a plurality of blocks, first encryption means for encrypting more than one blocks of the plurality of blocks using a first key, second encryption means for encrypting more than one blocks of the blocks other than those encrypted by the first encryption means using a second key, and information sending means for sending outgoing information including the blocks encrypted by the first encryption means and those encrypted by the second encryption means.

13 Claims, 11 Drawing Sheets

□ KEY K1 ENCRYPTED BY C'S PUBLIC KEY Kpc

▦ KEYS K1 ENCRYPTED BY SECRET KEY Ksab

▩ ENCRYPTED DATA (ENCRYPTED BY KEY K1) THAT CAN BE DECRYPTED BY B AND C

▨ ENCRYPTED DATA (ENCRYPTED BY SECRET KEY Ksab) THAT CANNOT BE DECRYPTED BY C BUT CAN BE DECRYPTED BY B

USER DATABASE 54

| USER NO. | USER NAME | USER PUBLIC KEY | DOWNLOAD HISTORY |
|---|---|---|---|
| 0001 | G | Kpg | |
| ⋮ | ⋮ | ⋮ | |
| 0231 | D | Kpd | 1998.8.11.CONTENTS X, WATERMARK⋯ |
| ⋮ | ⋮ | ⋮ | |
| 1012 | E | Kpe | |

FIG. 11

CONTENTS DATABASE 55

| CONTENTS NAME | KEY INFORMATION #1 | KEY INFORMATION #2 | TEMPORARY SECRET KEY | CONTENTS DATA (RAW DATA) |
|---|---|---|---|---|
| X | $E_{kS1}(K1)$ | $E_{Th}(K2)$ | $Tk$ | DATA X |
| Y | $E_{kS1}(K11)$ | $E_{Th+1}(K21)$ | $Tk+1$ | DATA Y |
| Z | $E_{kS1}(K12)$ | $E_{Th+2}(K22)$ | $Tk+2$ | DATA Z |
| ⋮ | ⋮ | ⋮ | ⋮ | ⋮ |

FIG. 12

INFORMATION SENDING SYSTEM AND METHOD FOR SENDING ENCRYPTED INFORMATION

BACKGROUND OF THE INVENTION

The present invention relates to an information sending system and method, which are characterized by the use of a specific data structure for outgoing information upon sending encrypted information.

Along with recent development of network techniques and spread of network communications, how to protect information flowing on a communication network such as a public network from an ill-disposed third party or the like is very important. For this reason, data and messages are encrypted in communications.

For example, a system for encrypting outgoing information (mail) so that only an authorized receiver can decrypt that information upon sending data, e-mails, or the like from an intra-office LAN to a destination outside the office is used.

However, when communications are made by encrypting data or messages using a network, it is hard to find out only whether or not the encrypted information is sensitive information such as a top secret of an enterprise, which must not leak outside the enterprise.

On the other hand, if a system for auditing all the contents of all the pieces of outgoing information from an intra-office LAN is built, not only the enterprise secret information but also personal e-mails must be audited. However, such system fails to protect privacy, and excessive information auditing may stall enterprise activities. Hence, a mechanism which can audit only specific information of those to be sent is demanded.

Meanwhile, service providers provide data distribution services for distributing chargeable digital contents such as music data, image data, and the like via a public network.

In such data distribution, in order to prevent free acquisition of the contents by a perpetrator, it is indispensable to encrypt data before distribution. In this case, it is convenient if a person who is considering subscription to a distribution service can get a sample of data contents to determine whether he or she would really like to purchase the contents.

Hence, a mechanism which can keep all kinds of information secret from an eavesdropper and allows a specific person who is a potential data purchaser to partially restore information is required.

BRIEF SUMMARY OF THE INVENTION

It is an object of the present invention to provide an information sending system and method, which can send encrypted information which can be decrypted in units of portions of the information, i.e., stepwise, upon sending the encrypted information.

According to the first aspect of the present invention, there is provided an information sending system comprising information segmentation means for segmenting information into a plurality of blocks, first encoder for encrypting more than one blocks of the plurality of blocks using a first key, second encoder for encrypting more than one blocks of blocks other than the blocks encrypted by the first encryption means using a second key, and information sending means for sending outgoing information including the blocks encrypted by the first encoder and the blocks encrypted by the second encoder.

With this information sending system, blocks that form outgoing information are encrypted by different keys, and the outgoing information can be decrypted in units of blocks, i.e., stepwise.

According to the second aspect of the present invention, there is provided an information sending system comprising information segmentation means for segmenting information into a plurality of blocks, first encoder for encrypting more than one blocks of the plurality of blocks using a first key, second encoder for encrypting more than one block of blocks other than the blocks encrypted by the first encoder using a second key, information sending means for sending outgoing information including the blocks encrypted by the first encoder and the blocks encrypted by the second encoder, identification information appending means for appending, to the outgoing information, identification information indicating the blocks encrypted by the first encoder and the blocks encrypted by the second encoder of the blocks contained in the outgoing information, and key information appending means for appending, to the outgoing information, the encrypted first key, and the second key encrypted by an encryption key different from a key used for encrypting the first key.

With this information sending system, blocks that form outgoing information are encrypted by different keys, and the first and second keys for decrypting these blocks are encrypted by different keys and are added to the outgoing information. Hence, a person who has only a key that can decrypt the cryptograph of the first key can decrypt only the blocks encrypted by the first encoder, and a person who has both keys which can decrypt the cryptographs of the first and second keys can decrypt all the blocks of the received information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a table showing an example of the format of a user database;

FIG. 12 is a table showing an example of the format of a contents database;

DETAILED DESCRIPTION OF THE INVENTION

The preferred embodiments of the present invention will now be described.

FIRST EMBODIMENT OF THE INVENTION

In this embodiment, an information sending system and method of the present invention is applied to a mail sending system.

Figure 1:
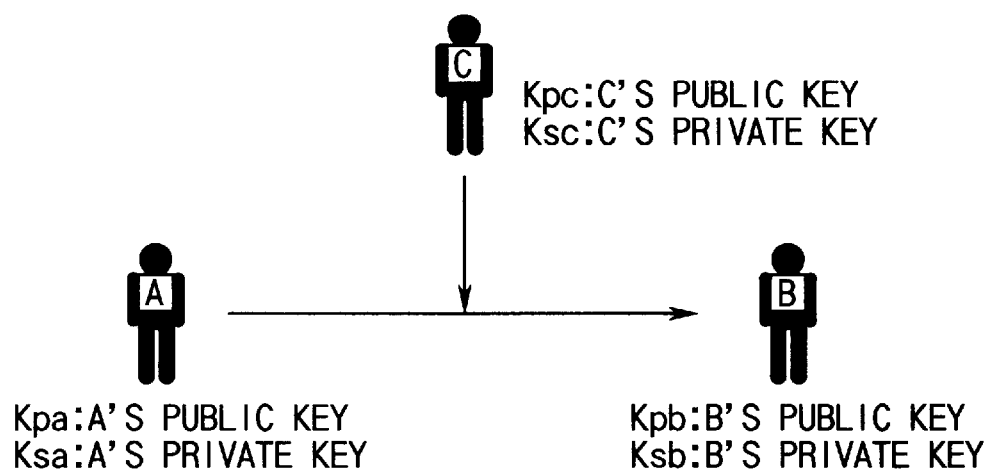
FIG. 1 is a view showing an example of a situation that uses an information sending system and method according to the first embodiment of the present invention.

FIG. 1 assumes a situation that uses the information sending system and method according to the first embodiment of the present invention.

In FIG. 1, A is a sender, and B is a receiver. C is an administrator who audits the communication contents sent from A. Such situation occurs when, for example, A is an employee of a given company, and C is the president of the company that employs A. Assume that B is a person outside the company.

In this embodiment, A and B make encrypted communications using public key cryptography such as RSA cryptography or the like. In this situation, as shown in FIG. 1, A has a public key Kpa and private key Ksa. Similarly, B has a public key Kpb and private key Ksb, and C has a public key Kpc and private key Ksc. Note that encrypted communications using RSA cryptography are described in Shinichi Ikeno and Kenji Koyama, "Modern Cryptography Theory", Ed., The Institute of Electronics, Information and Communication Engineers, pp. 105–123, Eiji Okamoto, "Introduction to Theory of Cryptography", Kyoritsu Shuppan, pp. 88–99, and the like.

In such case, a method of allowing administrator C to audit whether or not information sent by A is secret information of the company, without disclosing the entire contents of personal information sent from A to B to the administrator C as a third party will be explained below.

Figure 2:
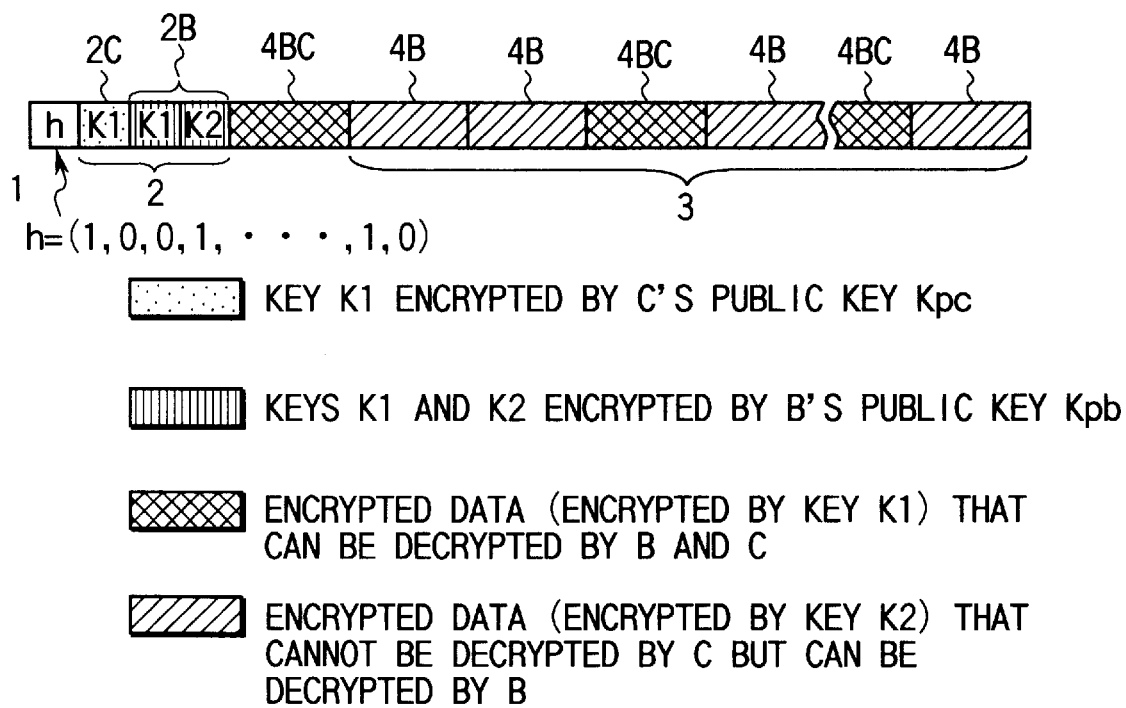
FIG. 2 shows an example of the data structure of outgoing information generated by the information sending method of the first embodiment.

FIG. 2 shows an example of the data structure of outgoing information generated by the information sending method of this embodiment.

In the data structure sent by A shown in FIG. 1, i.e., in a transmission packet (e.g., a mail), a header information field 1 and key information field 2 are appended in turn to the head of a data field 3.

The data field 3 is segmented into blocks 4B and 4BC (to be also simply referred to as blocks 4 hereinafter) having an equal size. The size of the block 4 is that for encryption.

Of these blocks, only the blocks 4BC can be decrypted by the administrator C. The administrator C determines the blocks 4BC that can be decrypted by himself or herself, and does not inform A of this header information.

In FIG. 2, the header information field 1 stores header information h which indicates blocks that can be decrypted by the administrator C. More specifically, the header information h is identification information indicating blocks 4 to be encrypted by either key K1 or K2. In the header information h shown in FIG. 2, h =1 corresponds to an encrypted block 4BC, and h=0 corresponds to an encrypted block 4B.

In this way, since the blocks 4BC that can be decrypted by the administrator C cannot be specified by A, it is impossible for the sender A to manipulate secret information that must not leak out so as not to be found by the administrator C.

In the example shown in FIG. 2, the blocks 4BC are encrypted blocks that can be decrypted by the administrator C and the receiver B, i.e., those encrypted by the key K1. On the other hand, the blocks 4B are encrypted blocks that can be decrypted by the receiver B alone, i.e., those encrypted by the key K2.

As for the blocks 4, the blocks 4BC can be decrypted by B and C and the blocks 4B can be decrypted by B alone since the key K1 used for encrypting and decrypting the blocks 4BC and the key K2 used for encrypting and decrypting the blocks 4B are encrypted and stored in the key information field 2.

The key information field 2 includes a B's key field 2B, and a C's key field 2C. The B's key field 4B stores the keys K1 and K2 encrypted by the B's public key Kpb, so that the keys K1 and K2 can be extracted by only the B's private key Ksb. On the other hand, the C's key field 2C stores the key K1 alone which is encrypted by the C's public key Kpc, so that the key K1 can be extracted by only the C's private key Ksc.

Hence, the administrator C can obtain only the key K1 from this transmission packet, and can audit the blocks 4BC only. On the other hand, the receiver B can obtain the keys K1 and K2 from this transmission packet, and can read all the blocks 4BC and 4B, i.e., the entire data field 3.

That is, the encrypted information shown in FIG. 2 sent from A is decrypted stepwise. In this embodiment, the blocks corresponding to the key K1 as the first step can be decrypted by the administrator C and the receiver B, and the blocks corresponding to the key K2 as the second step can be decrypted by the receiver B only.

An example of a mail system using this information sending method will be described in detail below.

Figure 3:
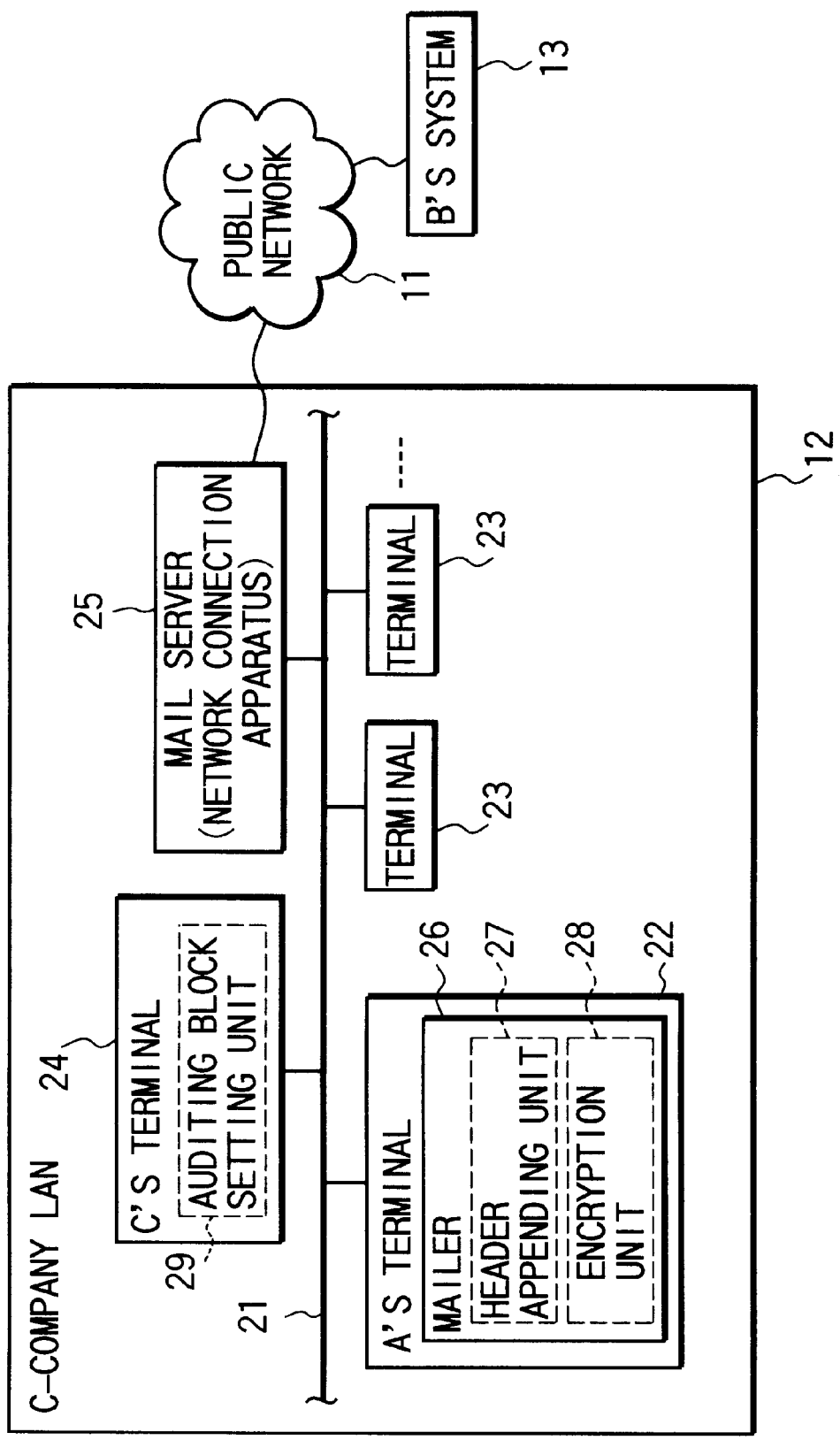
FIG. 3 is a block diagram showing an example of the arrangement of a network system to which an outgoing information auditing method according to the first embodiment is applied.

FIG. 3 is a block diagram showing an example of the arrangement of a network system to which an outgoing information auditing method according to this embodiment is applied.

This network system is built by connecting a C-company LAN 12 and a B's system 13 via a public network 11 as a communication means.

In the C-company LAN 12, an A's terminal 22 used by employee A and terminals 23 for other employees having the same arrangement as that of the A's terminal 22 are connected to a data transmission path 21, and a C's terminal 24, mail server 25, host computer (not shown), and the like are connected. Note that the terminals 22, 23, and 24, and mail server 25 are computer systems obtained by adding communication means to workstations, personal computers, and the like.

The main server 25 also serves as a network connection apparatus, and exchanges mails via the public network 11.

Also, the mail server 25 fetches mails on the data transmission path 21 of the C-company LAN, and sends them onto the public network 11 according to a predetermined rule.

The A's terminal 22 and terminals 23 can execute basic computer functions such as creations of documents, data, and the like, and each have a mailer 26, which can send the created data and document onto the public network 11 via the mail server 25.

The mailer 26 comprises a header appending unit 27 and encryption unit 28, appends required information such as an address and the like to the encrypted transmission packet, and sends it as a mail onto the data transmission path 21.

Upon sending a mail, the header appending unit 27 receives header information h from the C's terminal 24, informs the encryption unit 28 of that header information h, and appends the header information field 1 to the data field 3 and key information field 2 encrypted by the encryption unit 28. Note that the header appending unit 27 does not allow the sender A to read out the header information h, and the sender A cannot know the contents of the header information h before sending the mail.

The encryption unit 28 segments the data field 3 into blocks and encrypts the blocks on the basis of the header information h received from the header appending unit 27, also encrypts keys used for encrypting the data field 3, and stores them in the key information field 2.

On the other hand, the C's terminal 24 comprises an auditing block setting unit 29 that can set blocks to be audited in data (mails) sent from the C-company LAN 12, and can audit all the mails sent from the C-company LAN 12 to the mail server 25. Furthermore, the C's terminal 24 can set mail sending conditions of the mail server 25. Note that the C's terminal 24 can display the contents of the audited blocks.

The auditing block setting unit 29 generates header information as information for determining the blocks 4BC that can be audited by C. As a method of determining the number n of blocks that can be decrypted by the administrator C as a function of the auditing block setting unit 29, for example, a random positive integer n (0<n<m) having the total number m of blocks of information sent by A as its upper limit may be generated. On the other hand, the upper and lower limits may be arbitrarily determined by the administrator C.

The auditing block setting unit 29 sets the layout of the blocks 4BC that can be decrypted by the administrator C by determining the random variable on the basis of, e.g., date and time information of communications made from A to B.

Note that the header information h is secret information, and the units 29, 26, 27, 28, and the like are configured so that the header information h may not leak out to persons other than the administrator C.

The conditions set in the mail server 25 may include that, for example, only the audited mails are sent, only mails for which a predetermined period of time has elapsed after they were fetched by the mail server 25 are sent, only mails of predetermined senders designated by the administrator C are not sent before they are audited, and so forth.

The operation of the information sending system according to the embodiment of the present invention with the above-mentioned arrangement will be explained below.

Figure 4:
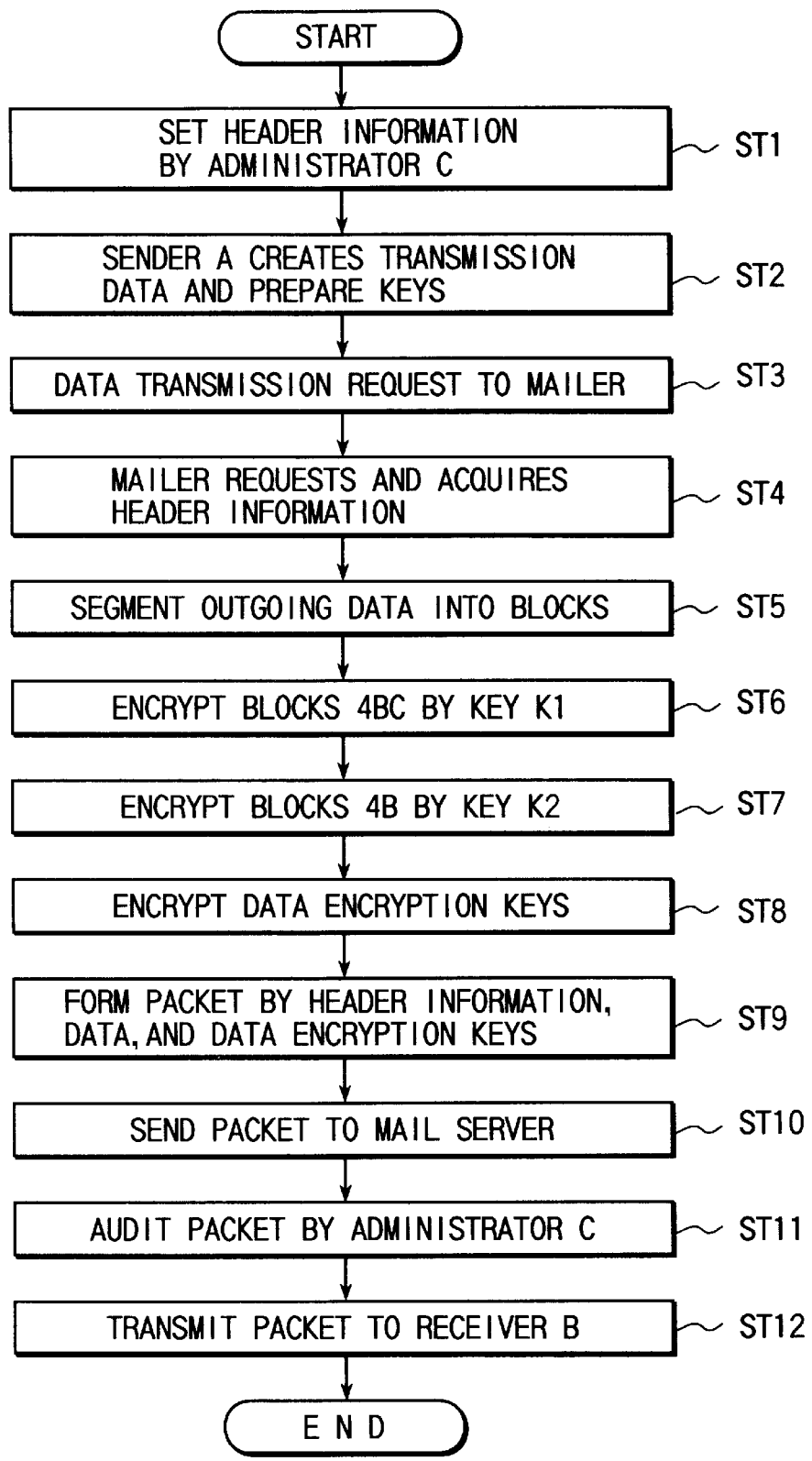
FIG. 4 is a flow chart showing the operation of the system to which the information sending method of the first embodiment is applied.

FIG. 4 is a flow chart showing the operation of the system to which the information sending method of this embodiment is applied.

The administrator sets header information (ST1). This information may be simultaneously set for all the terminals 22 and 23 connected to the C-company LAN 12, or may be individually set. Note that the header information is determined in advance by the auditing block setting unit 29.

Then, the sender A creates data to be transmitted, and the B's public key Kpb and C's public key Kpc required for encrypted communications are prepared (ST2). Note that the public keys Kpb and Kpc are registered in advance in the encryption unit 28.

The sender A issues a transmission request of data to the mailer 26 (ST3).

In response to this request, the header appending unit 27 of the mailer 26 requests header information of the auditing block setting unit 29 (ST4). The acquired header information is passed to the encryption unit 28, and the encryption unit 28 segments the outgoing data into blocks (ST5).

Furthermore, by the processing of the encryption unit 28 based on the header information, the blocks 4BC that can be decrypted by the administrator C are encrypted by the key K1 (ST6), and the blocks 4B which cannot be decrypted by the administrator C but can be decrypted by the receiver B alone are encrypted by the key K2 (ST7).

In this operation example, the header information is determined in advance in step ST1. As another header information determination method, as described above, header information may be randomly and individually determined on the basis of date and time information of communications made from the sender A to the receiver B. When such determination method is used, step ST1 above is executed when the mailer 26 requests header information of the auditing block setting unit 29 in step ST4.

The key K1 is encrypted by the public key Kpc of the administrator C, and the keys K1 and K2 are encrypted by the public key Kpb of the receiver B (ST8). The header appending unit 27 then appends a key information field 2 and header information field 1 to an encrypted data field 3, thus obtaining a transmission packet for a mail (ST9).

The mailer 26 sends the obtained packet onto the data transmission path 21, and the mail server 25 fetches this packet (ST10).

The packet (mail addressed to B) stored in the mail server 25 is audited by the administrator C. That is, the administrator C decrypts the key K1 encrypted by his or her public key Kpc using his or her private key Ksc to extract the key K1. Note that the administrator C cannot extract the key K2. The administrator C decrypts only the blocks 4BC that can be decrypted by the extracted key K1 on the basis of the header information h and checks the contents (ST11).

After the auditing, the mail server 25 sends the mail (transmission packet) addressed to B onto the public network, and that mail is received by the B's system 13 (ST12).

Upon receiving the mail, the receiver B decrypts and extracts the keys K1 and K2 encrypted by his or her public key Kpb using his or her private key Ksb. The blocks 4BC encrypted by the key K1 and blocks 4B encrypted by the key K2 are decrypted on the basis of the header information h. In this way, the receiver B can read all the pieces of information in the mail.

To restate, in the information sending system and mail according to the embodiment of the present invention, data to be sent from the sender A is broken up into a plurality of blocks, and a transmission packet is formed by blocks 4BC which are encrypted to be decryptable by the administrator C and the receiver B, and blocks 4B which are encrypted to be decryptable by the receiver B only. Hence, the administrator can audit whether or not the outgoing information is secret information such as a secret of an enterprise. In this fashion, secret information such as a secret of the enterprise and the like can be prevented from leaking out, and privacy of the sender can be protected. That is, encrypted communications can be made to a partner (receiver) without disclosing all the communication contents to the administrator. Note that the receiver can decrypt all the communication contents.

In this way, the information sending system and method of this embodiment can send encrypted information which can be decrypted stepwise upon sending encrypted information.

Also, since decryption keys are separately sent as a key that can be decrypted by the administrator alone and a key that can be decrypted by the partner (receiver), it becomes harder for a third party to eavesdrop on and read communications.

SECOND EMBODIMENT OF THE INVENTION

In this embodiment, a method of auditing a leak of secret information using a transmission packet having a format different from that of the first embodiment will be explained.

Figure 5:
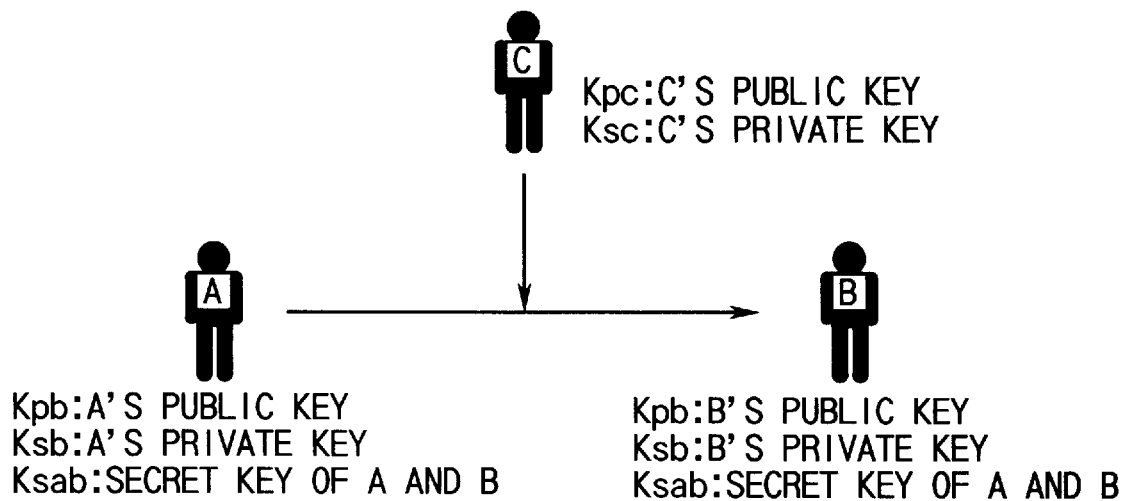
FIG. 5 is a view showing an example of a situation that uses an information sending system and method according to the second embodiment of the present invention.

FIG. 5 assumes a situation that uses an information sending system and method according to the second embodiment of the present invention. The same reference numerals in FIG. 5 denote the same parts as in FIG. 1, and a detailed description thereof will be omitted.

In the situation shown in FIG. 5, the sender A and the receiver B have a secret key Ksab as a private key shared by these two individuals. The administrator C does not know the secret key Ksab.

Figure 6:
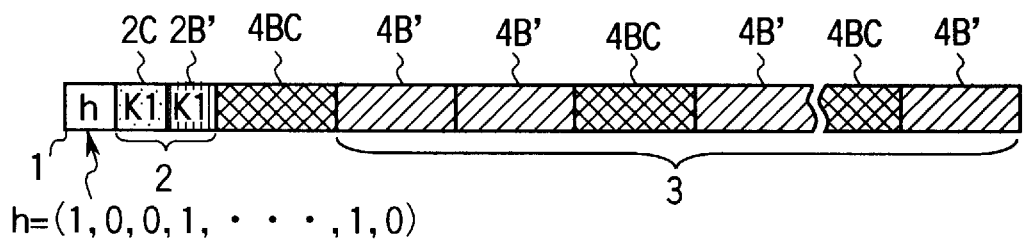
FIG. 6 shows an example of the data structure of outgoing information generated by the information sending method of the second embodiment.

FIG. 6 shows an example of the data structure of outgoing information generated by the information sending method of this embodiment. The same reference numerals in FIG. 6 denote the same parts as in FIG. 2, and a detailed description thereof will be omitted.

This transmission packet is configured by a header information field 1, key information field 2, and data field 3. In this embodiment, the data structure is substantially the same as that in the first embodiment, except that a B's key field 2B' stores a key K1 encrypted by the secret key Ksab, and blocks 4B' that can be decrypted by B alone are encrypted by the secret key Ksab. As secret key cryptography that can be applied to this embodiment, DES is known. Note that the correspondence between header information h, and blocks 4BC and 4B' exemplified in FIG. 6 is the same as that in the first embodiment.

A mail system to which this information sending method is applied has substantially the same arrangement as that of the first embodiment shown in FIG. 3, except that the secret key Ksab is used for encryption, and the arrangement of the encryption unit 28 is modified to form the packet shown in FIG. 6.

The flow of the processing in the information sending system and method of this embodiment will be explained below.

The operation of the overall system is the same as processing flow shown in FIG. 4. The difference in processing from the first embodiment resulting from the difference in packet structure and keys to be used will be explained.

In this embodiment, blocks 4BC that can be decrypted by the administrator C are encrypted by the key K1 in step ST6 in FIG. 4. In step ST8, the key K1 is encrypted by the public key Kpc of the administrator C, and is stored in a C's key field 2C.

On the other hand, in step ST7 in FIG. 4, blocks 4B' that cannot be decrypted by the administrator C but can be decrypted by B alone are encrypted by the secret key Ksab. Also, in step ST8, the key K1 is encrypted by the secret key Ksab, and is stored in a B's key field 2B'. Note that the key K1 may be encrypted by the B's public key Kpb as in the first embodiment.

Also, information h indicating the blocks 4BC that can be decrypted by the administrator C, i.e., blocks 4BC encrypted by the key K1, is stored in the header information field 1 as in the first embodiment.

In this manner, the packet formed by the mailer 26 is sent to the mail server 25.

The administrator C accesses the mail server 25 to extract the key K1 by decrypting it encrypted by his or her public key Kpc using his or her private key Ksc. Note that the administrator C does not know the secret key Ksab. For this reason, the administrator C decrypts only the blocks encrypted by the key K1 on the basis of the header information h.

On the other hand, upon receiving the transmission packet, the receiver B decrypts and extracts the key K1 encrypted by the secret key Ksab using the secret key Ksab shared by the sender A. The receiver B then decrypts blocks encrypted by the key K1, and also decrypts blocks encrypted by the secret key Ksab.

To recapitulate, in the information sending system and method according to the embodiment of the present invention, since the blocks 4B' are encrypted by the secret key Ksab in addition to the same means as those in the first embodiment, the same effect as in the first embodiment can be obtained using secret key cryptography. In this embodiment, since the secret key Ksab of the receiver B is used, the receiver B need not have any public key and private key of the private key system.

THIRD EMBODIMENT OF THE INVENTION

In the first and second embodiments, the present invention is applied to a mail system. In this embodiment, the information sending system and method of the present invention is applied to a system for distributing digital contents such as image data, music data, and the like.

Figure 7:
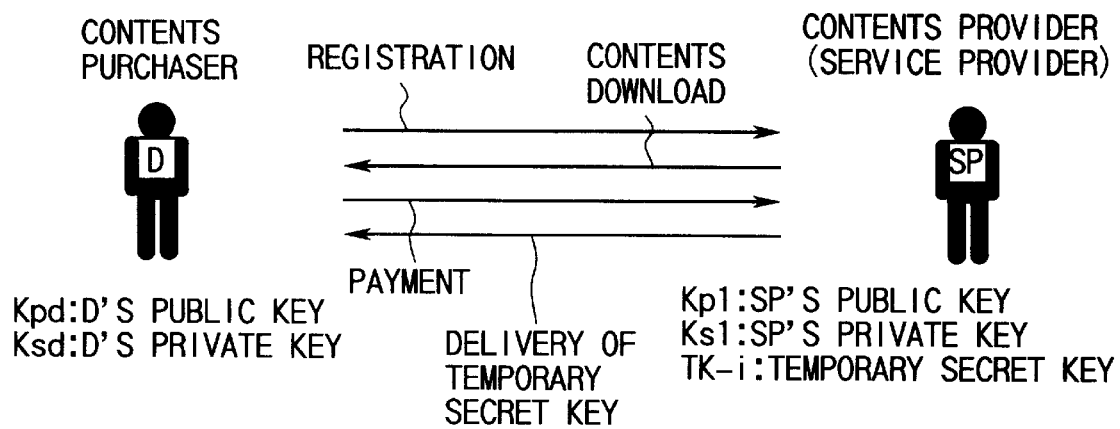
FIG. 7 is a view showing an example of a situation that uses an information sending system and method according to the third embodiment of the present invention.

FIG. 7 assumes a situation that uses the information sending system and method according to the third embodiment of the present invention. The same reference numerals in FIG. 7 denote the same parts as in FIG. 1 or 5, and a detailed description thereof will be omitted.

FIG. 7 assumes a case wherein a service provider SP which distributes various contents data to a user D as a registered member. Note that user D has his or her public key Kpd and private key Ksd. On the other hand, the service provider SP has its public key Kp1 and private key Ks1, and temporary secret keys Tk, Tk+1, Tk+2, Tk+3, . . . (to be described as Tk+i or simply Tk hereinafter).

In FIG. 7, the service provider SP as a contents distributor and the user D as a contents purchaser make contents transaction in the following procedure.

After the user D is registered as a member, the service provider SP delivers its public key Kp1 to the user D. The user D accesses a contents database of the service provider SP, selects contents based on their names and the like, and downloads contents data of his or her choice. The user D can decrypt a part of the downloaded contents data using the public key Kp1. The user D listens to the partial data (music contents or the like) or watches it (image data or the like) on a trial basis. When the user D decides to purchase the contents, he or she pays a fee, and receives a key Tk that can decrypt the remaining part from the service provider SP.

Figure 8:
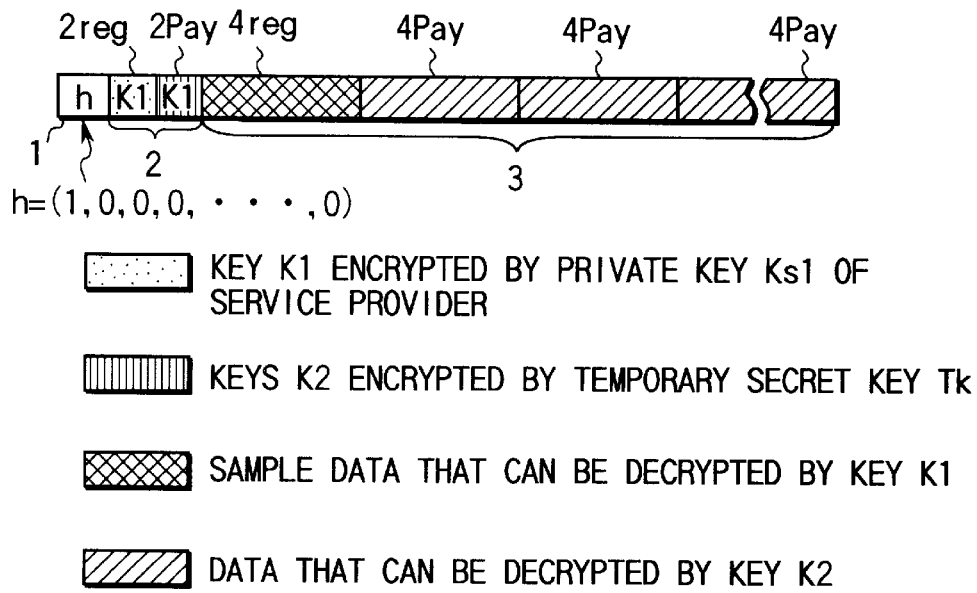
FIG. 8 shows an example of the data structure of outgoing information generated by the information sending method of the third embodiment.

FIG. 8 shows an example of the data structure of outgoing information generated by the information sending method of this embodiment. The same reference numerals in FIG. 8 denote the same parts as in FIG. 2 or 6, and a detailed description thereof will be omitted.

This transmission packet is configured by a header information field 1, key information field 2, and data field 3. The key information field 2 includes a sample key field 2reg and paid key field 2pay.

The sample key field 2reg stores a key K1 (or K11, K12, . . . ; to be simply referred to as K1 hereinafter) encrypted by the private key Ks1 of the service provider SP as key information #1 (Eks1(K1)).

Similarly, the paid key field 2pay stores a key K2 (or K21, K22, . . . ; to be simply referred to as K2 hereinafter) encrypted by the secret key Tk as key information #2 (ETk(K2)).

On the other hand, the data field 3 includes sample data blocks 4reg and paid data blocks 4 pay, which are encrypted to be respectively decryptable by the keys K1 and K2. That is, the sample data blocks 4reg can be listened to or watched on a trial basis as long as the user D is a registered member. On the other hand, the paid data blocks 4 pay are the remaining part of the data field which can be decrypted only after the user pays a fee for the contents. In this way, the encrypted information shown in FIG. 8 can be decrypted stepwise.

Note that the header information field 1 stores header information h indicating the correspondence between the key information field 2 and data field 3.

An example of the data distribution system to which the information sending method is applied will be explained in detail below.

Figure 9:
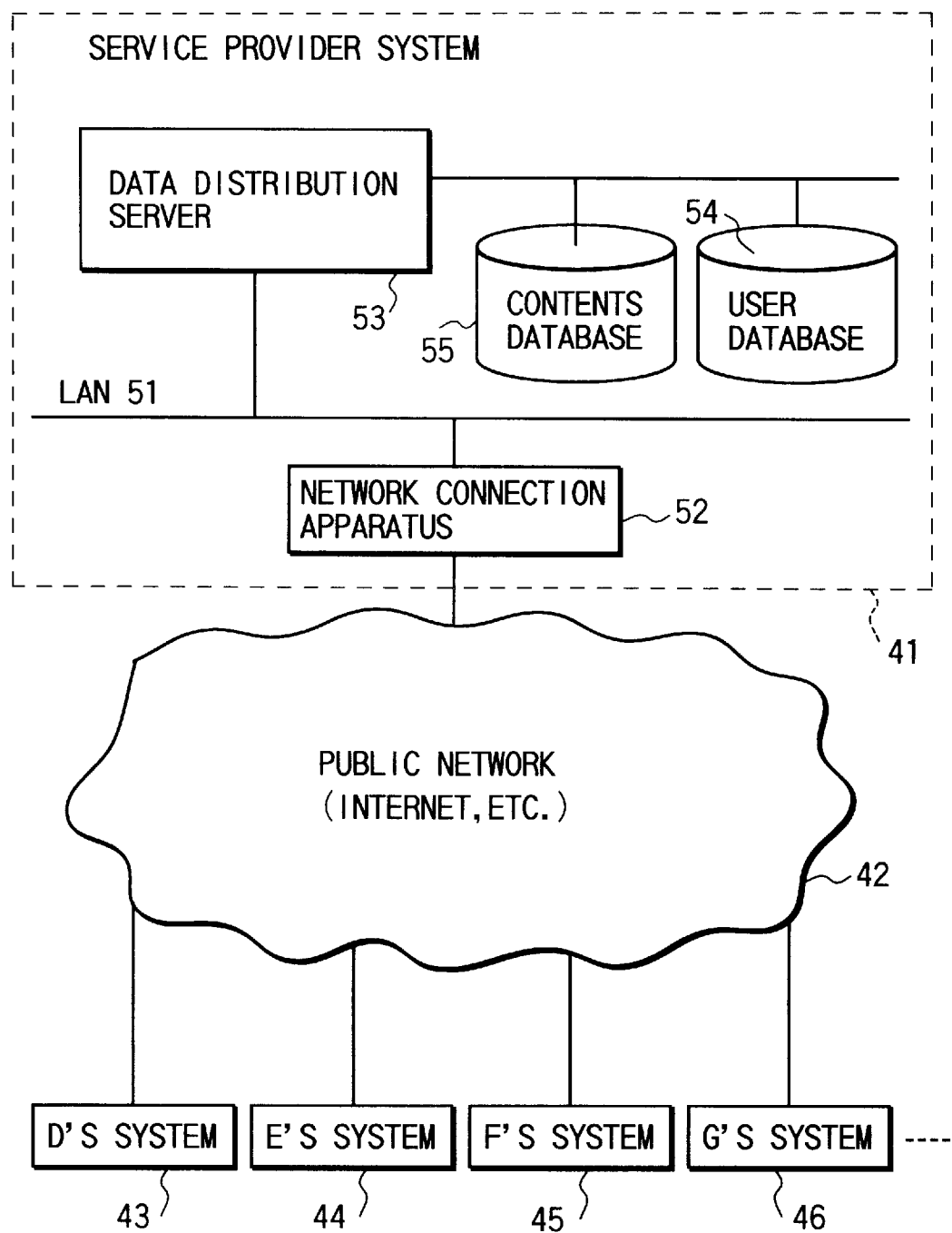
FIG. 9 is a block diagram showing an example of the arrangement of a network system to which an outgoing information auditing method according to the third embodiment is applied.

FIG. 9 is a block diagram showing an example of the arrangement of a network system to which an outgoing information auditing method according to this embodiment is applied.

This network system is built by connecting a service provider system 41 to systems 43, 44, 45, 46, . . . , of users D, E, F, G, . . . via a public network 42.

The service provider system 41 is constructed by connecting a network connection apparatus 52 for connecting the public =network, and a data distribution server 53 to a LAN 51. The data distribution server 53 comprises a computer such as a workstation or the like, and is connected to a user database 54 and contents database 55.

Figure 10:
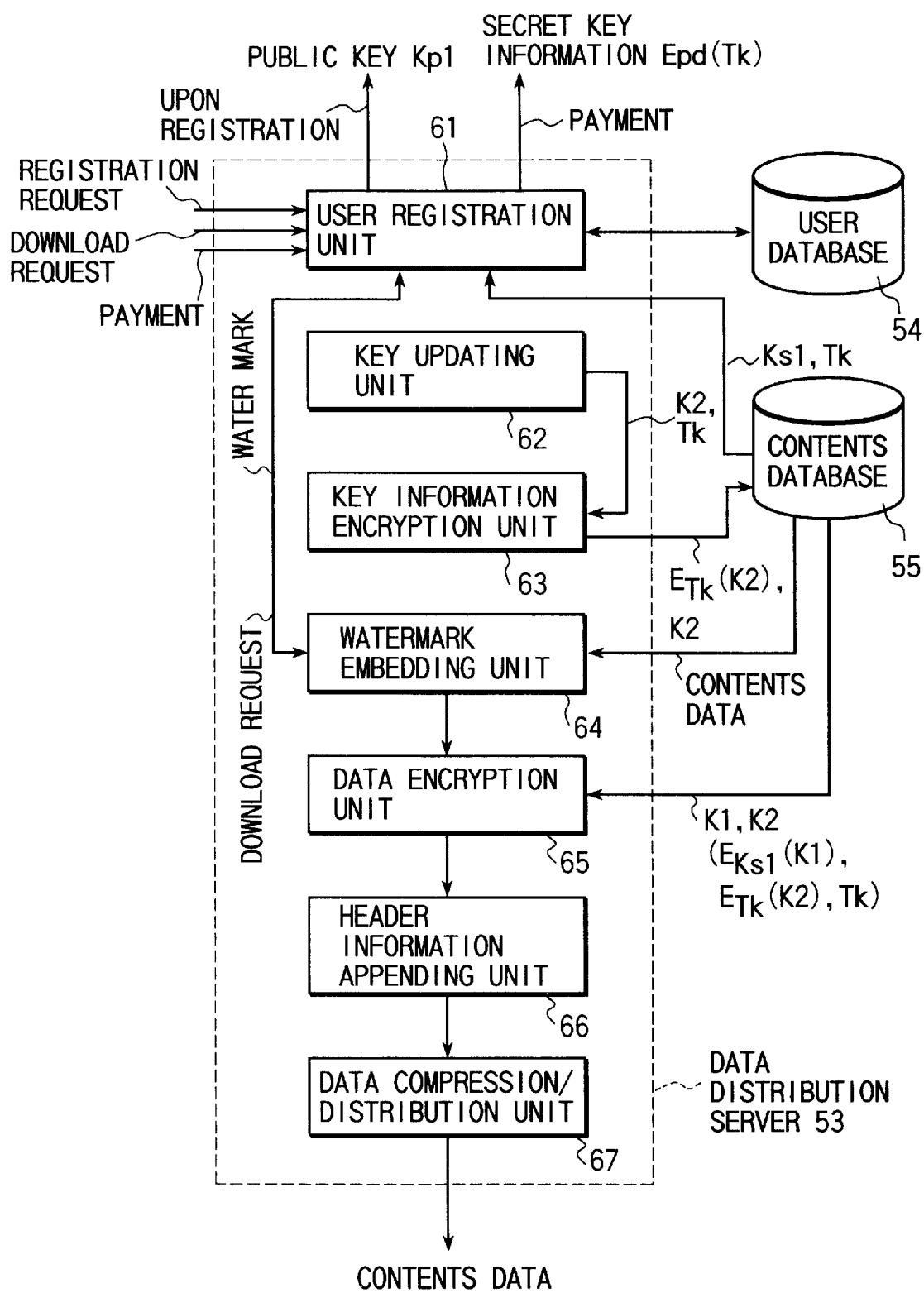
FIG. 10 is a block diagram showing an example of the detailed arrangement of a data distribution server.

FIG. 10 is a block diagram showing an example of the detailed arrangement of the data distribution server.

The respective blocks in the data distribution server 53 shown in FIG. 10 correspond to functional blocks implemented by combinations of hardware means such as a CPU, memory, and the like, and software means such as a control program, data, and the like.

The data distribution server 53 is comprised of a user registration unit 61, key updating unit 62, key a information encryption unit 63, watermark embedding unit 64, data encryption unit 65, header information appending unit 66, and data compression/distribution unit 67.

The user registration unit 61 performs various registration processes to the user database 64, delivery of the public key Kp1 to registered members, delivery of secret key information Epd(Tk), notification of a download request, and the like in correspondence with a registration request, download request, fee payment, and the like. Note that a search means (not shown) of the contents database 55 is included in the user registration unit 61.

The watermark embedding unit 64 selects and retrieves contents data corresponding to a download request from the contents database 55, and embeds a watermark in the raw data. That is, the watermark embedding unit 64 serves as an information selection means. Also, the unit 64 makes the user registration unit 61 register the embedded watermark information in the user database 54.

The data encryption unit 65 segments contents data embedded with the watermark into sample data blocks 4reg and paid data blocks 4pay, encrypts these blocks 4reg and 4pay by K1 and K2, respectively, and passes such encrypted information to the header information appending unit 66 together with header information h.

The header information appending unit 66 adds the header information field 1 and key information field 2 to the encrypted contents data (data field 3) to form distribution data shown in FIG. 8.

The data compression/distribution unit 67 compresses the distribution data formed by the header information appending unit 66, and transmits it to the user.

FIG. 11 shows an example of the format of the user database.

The user database 54 registers the user names of registered members in correspondence with user numbers, and also registers the public keys (Kpd and the like) of the corresponding users. A user public key was transmitted from each user upon member registration, and was registered by the user registration unit 61.

The user database 54 also registers download histories in units of registered users. That is, history information including the download date, contents name, watermark embedded in the contents data, and the like is saved every time the contents data is downloaded.

FIG. 12 shows an example of the format of the contents database.

The contents database 55 stores contents names, key information #1 (Esk1(K1)), key information #2 (ETk(K2)), contents data (raw data), and the like in units of contents.

Note that the key information #1 is obtained by encrypting the key K1 by the private key Ks1 of the service provider SP, and the key information #2 is obtained by encrypting the key K2 by the temporary secret key Tk.

The keys K1, K2, and Tk are prepared in units of contents, and the keys K2 and Tk are changed at predetermined time intervals. In this way, identical contents data can be prevented from being repetitively got without any payment by a single contents purchase.

These keys K2 and Tk are changed by the key updating unit 62. The key information encryption unit 63 receives the keys K2 and Tk changed by the key updating unit 62, generates new key information #2 based on these keys, and updates the contents of the key information #2 in the contents database 55 at predetermined time intervals.

The processing flow in the information sending system and method of this embodiment will be explained below.

Figure 13:
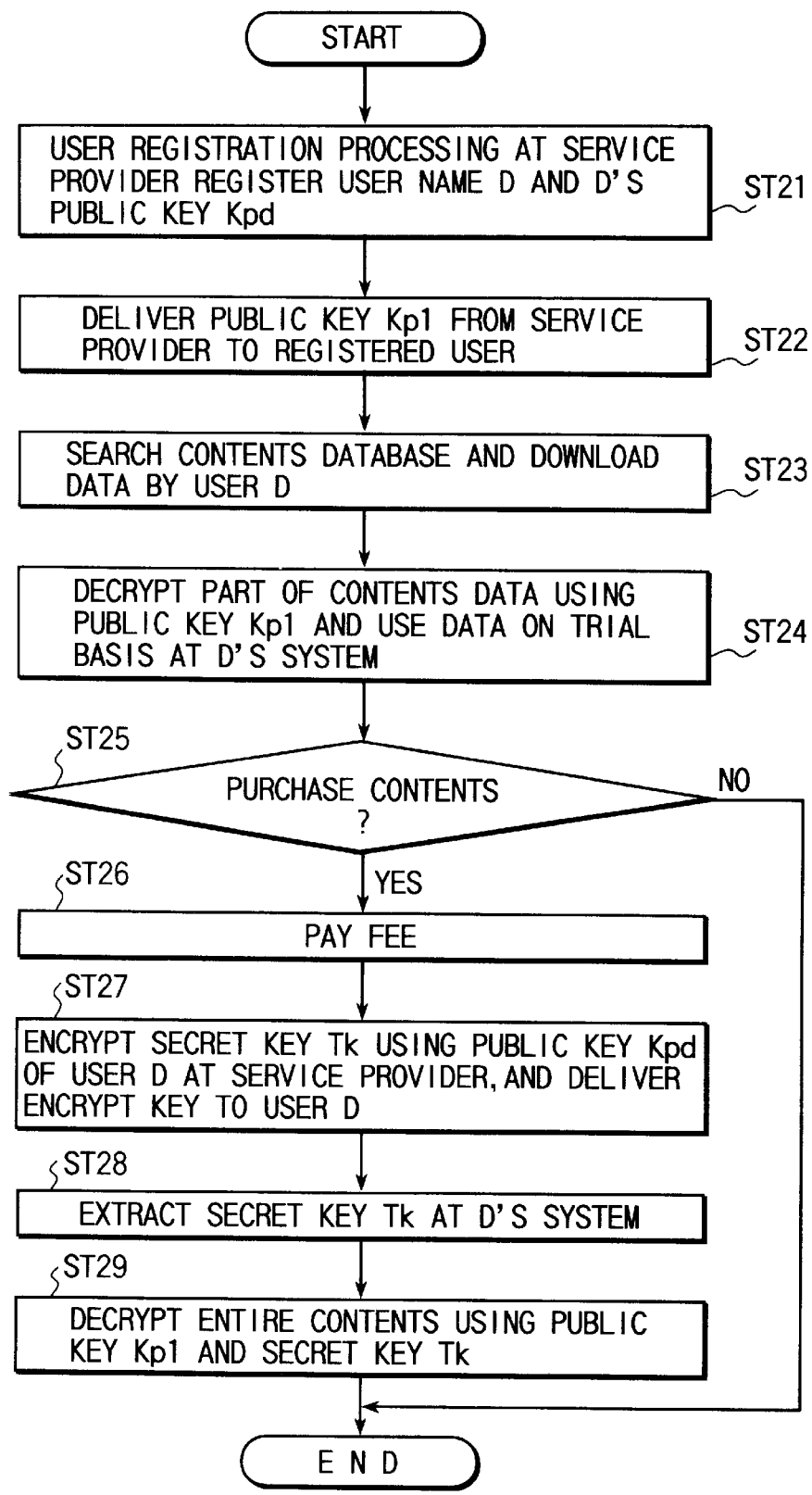
FIG. 13 is a flow chart showing contents data distribution in the third embodiment.
Figure 14:
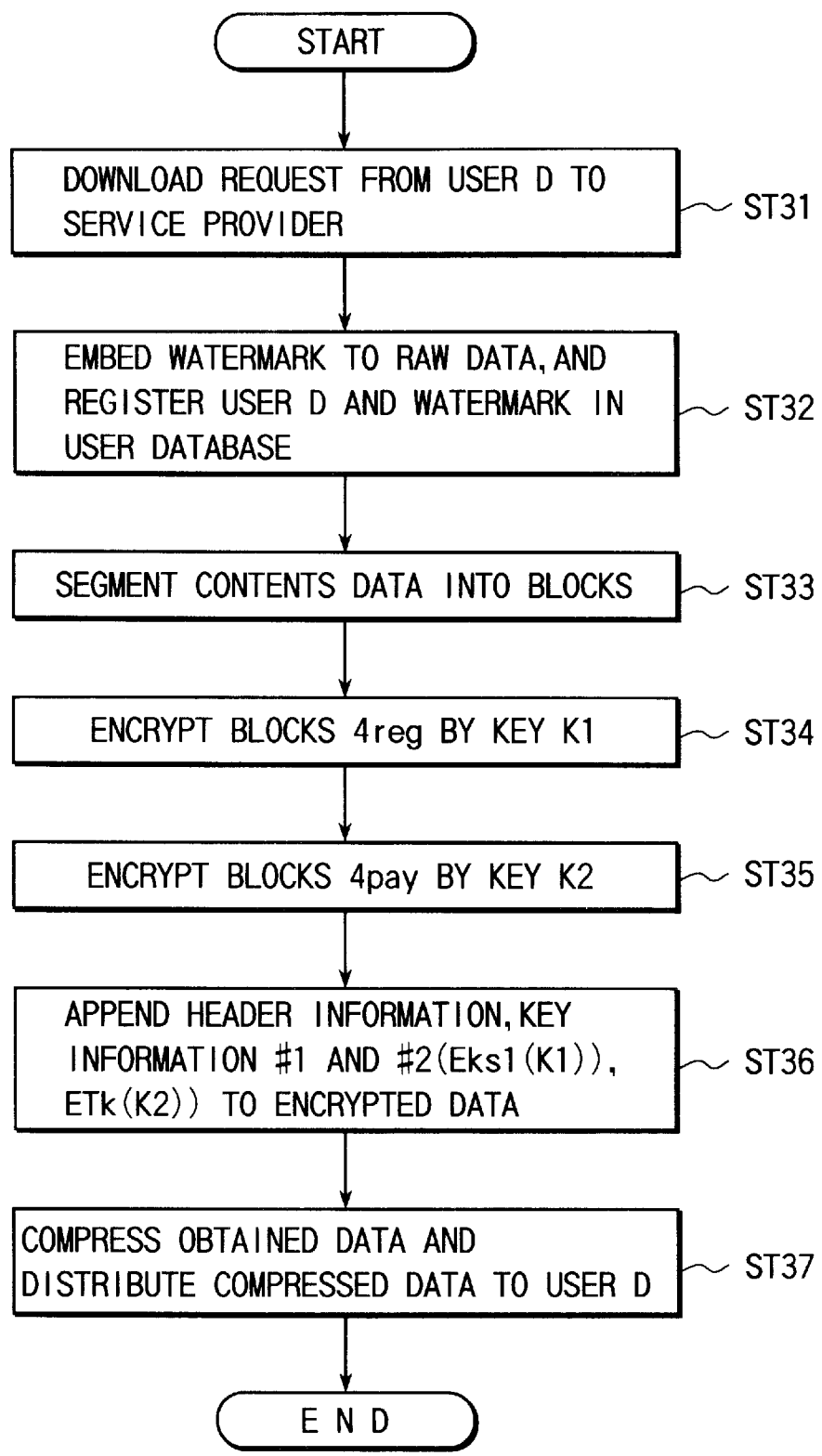
FIG. 14 is a flow chart showing downloading in the third embodiment.

FIGS. 13 and 14 are flow charts showing contents data distribution in this embodiment. In these drawings, a case will be exemplified wherein the user D transacts with the service provider SP.

In FIG. 13, the user D issues a registration request to the data distribution server 53, and his or her user name D and public key Kpd are registered in the user database 54 (ST21).

The data distribution server 51 delivers the public key Kp1 of the service provider SP to the user D (ST22).

After that, the user D searches the contents database 55 and downloads desired contents data (ST23). The downloading is shown in FIG. 14, and will be explained later.

After downloading, the user D decrypts the sample key field 2reg containing the key information #1 using the public key Kp1 received in step ST21 to extract the key K1. The user D decrypts sample data blocks 4reg using this key K1, and can use that part on a trial basis (ST24).

If the user D decides to purchase that contents data after the trial (ST25), he or she pays a fee for that data (ST26).

In response to the fee payment, the data distribution server 53 delivers the secret key Tk for decrypting the key information #2 (paid key field 2pay) for that contents data to the user D (ST27).

This delivery is realized when the secret key Tk is encrypted by the public key Kpd of the user D registered in the user database 54, and the encrypted key is transmitted as key information Ekpd(Tk) to the user D.

The key information Ekpd(Tk) is decrypted by the private key Ksd of the user D in the D's system 43 to extract the secret key Tk (ST28). Then, the data field 3 including the sample data blocks 4reg and paid data blocks 4pay is decrypted by the keys K1 and Tk, and the entire original contents data is reconstructed (ST29).

The downloading in step ST23 in FIG. 13 will be described in detail below with the aid of FIG. 14.

Upon reception of a download request from the user D in the data distribution server 53 (ST31), the watermark embedding unit 64 selects and retrieves the corresponding contents raw data from the contents database 55. In this raw data, a watermark indicating that the corresponding data is distributed to the user D is embedded (ST32). By detecting the embedded watermark, a pirated version of that contents data copied or altered by the user D can be detected.

Note that information pertaining to the watermark is registered in history information of the user D in the user database 54 (ST32).

Subsequently, the data encryption unit 65 segments the contents data embedded with the watermark into sample data blocks 4reg and paid data blocks 4pay (ST33). These blocks 4reg and 4pay are respectively encrypted by the keys K1 and K2, and header information h indicating the attributes of the blocks is created (ST34, ST35). Note that the keys K1 and K2 used by the data encryption unit 65 at that time may be saved (not shown) in the contents database 55 and may be read out, or a storage unit (not shown) of the keys K1 and K2 may be added to the data distribution server 53.

The encrypted contents data and header information h, and key information #1 and key information #2 corresponding to the keys K1 and k2 are passed from the data encryption unit 65 to the header information appending unit 66, and are appended to the data field 3 by the header information appending unit 66 (ST36).

The obtained outgoing information (FIG. 8) is compressed by the data compression/distribution unit 67, and is distributed to the user D (ST37).

As described above, in the information sending system and method according to the embodiment of the present invention, the data field 3 to be sent by the data distribution server 53 is segmented into a plurality of kinds of blocks 4reg and 4pay, which are encrypted by different types of key information 2reg and 2pay (key information #1 and key information #2). Hence, the user as a registered member can decrypt sample data contents, and can pay after he or she confirms the contents. Upon payment, the user can receive secret key information Ekpd(Tk), and can decrypt the remaining contents.

That is, the aforementioned effect can be obtained by transmitting encrypted information that can be encrypted stepwise upon sending encrypted information.

Note that the present invention is not limited to the above-mentioned embodiments, and various modifications may be made without departing from the spirit and scope of the invention.

For example, in the description of the first embodiment, A, B, and C have public and private keys, and in the description of the second embodiment, A and B have the secret key Ksab. However, the keys to be possessed by users and corresponding encryption schemes are not limited to such specific cases. That is, the present invention can be applied in correspondence with various types of encryption schemes or various key possession cases of the users. The same applies to the third embodiment.

In each of the above embodiment, two different types of encrypted blocks are formed using the keys K1 and K2. However, the number of encryption steps is not limited to two. For example, many types of encrypted blocks may be formed and sent using three, four, or more kinds of keys.

In the third embodiment, contents data before encryption is stored in the contents database 55. However, the present invention is not limited to such specific case. For example, contents data may be segmented into blocks in advance, some blocks are encrypted by the key K1, the remaining blocks are encrypted by the key K2, and these blocks may be stored as contents data (encrypted) in the database 55.

In each of the above embodiments, header information h for all the blocks is appended to the head of the packet. However, the appending method of the header information h is not limited to such specific method.

Figure 15:
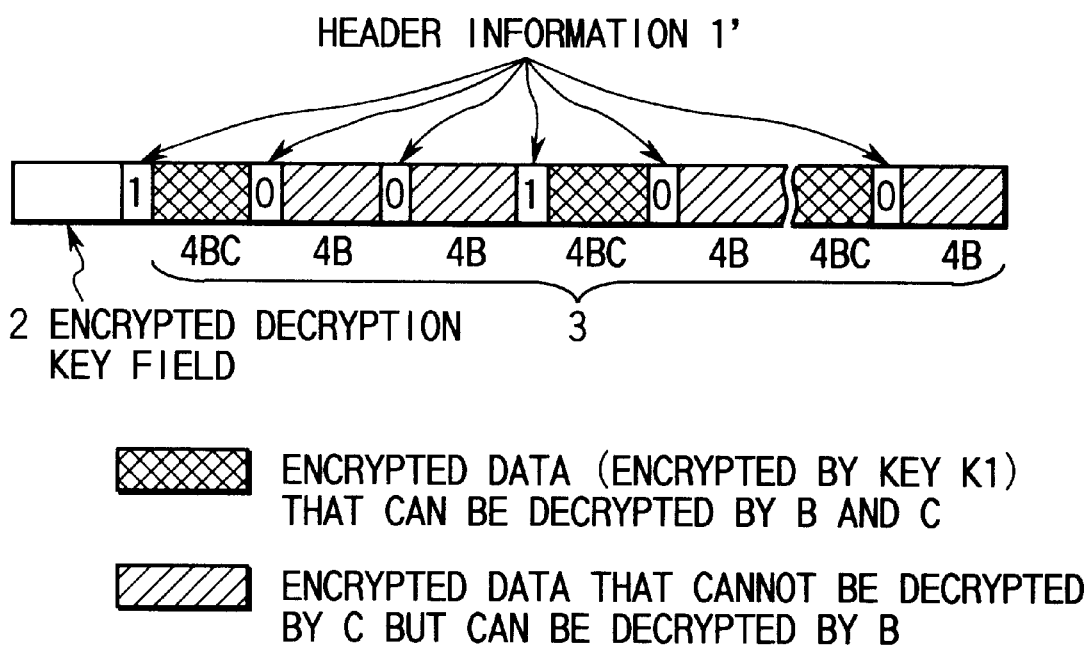
FIG. 15 shows an example of data line-up in outgoing information when header information h is independently appended to the head of each block.

FIG. 15 shows an example of data line-up of outgoing information when header information h is independently appended to the head of each corresponding block.

In this manner, header information h may be stored together as a header information field 1, as shown in FIGS. 2, 6, or 8, or may be stored as distributed header fields 1' appended before corresponding encrypted blocks 4, as shown in FIG. 15.

The method described in each of the above embodiments may be distributed as a program (software means) that can be executed by a computer while being stored in a storage medium such as a magnetic disk (floppy disk, hard disk, or the like), optical disk (CD-ROM, DVD, or the like), semiconductor memory, or the like, or being transmitted via a communication medium. Note that the program stored in the medium includes in the computer a setup program for installing the software means (including not only an execution program but also tables, data structures, and the like) to be executed by the computer. The computer which implements the apparatus of the present invention executes the above-mentioned processing under the control of the software means set up by loading the program recorded in the storage medium, or via the setup program in some cases.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information sending system comprising:

an information segmenter configured to segment information into a plurality of blocks;

a first encoder configured to encrypt more than one block of the plurality of blocks using a first key;

a second encoder configured to encrypt more than one block of the plurality of blocks other than the blocks encrypted by said first encoder using a second key; and an information sender configured to send outgoing information including the blocks encrypted by said first encoder and the blocks encrypted by said second encoder to a first receiver, and to send outgoing information including the blocks encrypted by said first encoder to a second receiver, wherein the first receiver being able to decrypt the blocks of the plurality of blocks encrypted by the first key and the blocks of the plurality of blocks encrypted by the second key using the first and second keys in order to understand a meaning of the information, and a second receiver being able to decrypt the blocks of the plurality of blocks encrypted by the first key using the first key in order to check the blocks encrypted by the first key.

2. A system according to claim 1, further comprising:

an identification information appending means for appending, to the outgoing information, identification information indicating the blocks encrypted by said first encoder and the blocks encrypted by said second encoder of the blocks contained in the outgoing information.

3. A system according to claim 2, further comprising:

a key information appending means for appending, to the outgoing information, the encrypted first key, and the second key encrypted by an encryption key different from a key used for encrypting the first key.

4. A system according to claim 3, further comprising:

an outgoing information auditing means for auditing contents of outgoing information to be sent by said information sending means, said outgoing information auditing means including:
  a key decoder for decrypting the encrypted first key appended by said key information appending means;
  a block decoder for decrypting the blocks encrypted by said first encoder on the basis of the first key decrypted by said key decoder, and the identification information; and
  an output means for outputting the blocks decrypted by said block decoder.

5. A system according to claim 4, wherein said outgoing information auditing means further includes:

an identification information passing means for passing the identification information to said first and second encoder upon encrypting the information to be segmented by said information segmentation means.

6. A system according to claim 3, further comprising:

a contents database for storing a plurality of kinds of information to be segmented by said information segmentation means.

7. A system according to claim 6, further comprising:

a user database for the registering the presence/absence of authority that allows reception of information in said contents database as the outgoing information; and an information selection means for selecting information to be segmented by said information segmentation means from said contents database in response to a request from a destination registered as an authorized user in said user database.

8. A system according to claim 7, further comprising:

a decryption key transmission means for transmitting a first key decryption for decrypting the encrypted first key to the destination registered as an authorized user in said user database.

9. A system according to claim 8, further comprising:

a second decryption key transmission means for transmitting a second key decryption key for decryption the encrypted second key to an authorized user when the authorized user who received the information selected by said information selection means as the outgoing information has paid a fee.

10. A system according to claim 3, further comprising:

a contents database for storing a plurality of kinds of contents data each of which contains blocks encrypted by said first encoder and blocks encrypted by said second encoder, and is to be included in the outgoing information; and an information selection means for selecting contents data from said contents database and passing the selected data to said information sending means in response to a request from a destination.

11. An information sending method comprising:

segmenting information into a plurality of blocks;

encrypting more than one blocks of the plurality of blocks using a first key;

encrypting more than one block of blocks other than the blocks encrypted in the first encryption step using a second key; and sending outgoing information including the blocks encrypted using the first key and the blocks encrypted using the second key to a first receiver, and sending outgoing information including blocks encrypted using the first key to a second receiver, wherein the first receiver being able to decrypt the blocks of the plurality of blocks encrypted by the first key and the blocks of the plurality of blocks encrypted by the second key using the first and second keys in order to understand meaning of the information, and a second receiver being able to decrypt the blocks of the plurality of blocks encrypted by the first key using the first key in order to check the blocks encrypted by the first key.

12. A method according to claim 11, further comprising:

appending, to the outgoing information, identification information indicating the blocks encrypted using the first key and the blocks encrypted using the second key contained in the outgoing information.

13. A method according to claim 12, further comprising:

appending, to the outgoing information, the encrypted first key, and the second key encrypted by an encryption key different from a key used for encrypting the first key.

* * * * *

UNITED STATES PATENT AND TRADEMARK OFFICE
CERTIFICATE OF CORRECTION

PATENT NO.    : 6,381,331 B1
DATED         : April 30, 2002
INVENTOR(S)   : Kato It is certified that error appears in the above-identified patent and that said Letters Patent is hereby corrected as shown below:

Column 14,
Line 17, change "decryption" (second occurrence) to -- decrypting --.

Signed and Sealed this

Fourteenth Day of January, 2003

JAMES E. ROGAN
*Director of the United States Patent and Trademark Office*